United States Patent
Sakane et al.

[11] Patent Number: 6,161,906
[45] Date of Patent: Dec. 19, 2000

[54] ANTI-SKID CONTROL SYSTEM

[75] Inventors: Shinsuke Sakane, Aichi-ken; Katsuo Ohbai, Anjo, both of Japan

[73] Assignee: Aisin Seiki Kabushiki Kaisha, Kariya, Japan

[21] Appl. No.: 09/181,857

[22] Filed: Oct. 29, 1998

[30]     Foreign Application Priority Data

Oct. 29, 1997 [JP] Japan .................................. 9-297453
Oct. 29, 1997 [JP] Japan .................................. 9-297455

[51] Int. Cl.$^7$ ...................................................... B60T 8/60
[52] U.S. Cl. .............................. 303/150; 303/3; 303/15; 303/113.1
[58] Field of Search .................................. 303/150, 147, 303/148, 149, 146, 156, 163, 122.09, 113.1, 113.4, 3, 15, 10

[56]             References Cited

U.S. PATENT DOCUMENTS

| | | | |
|---|---|---|---|
| 4,666,218 | 5/1987 | Masaki et al. | 303/150 |
| 4,970,649 | 11/1990 | Matsuda | 701/74 |
| 5,470,136 | 11/1995 | Tozu et al. | 303/147 |
| 5,664,850 | 9/1997 | Kuno et al. | 303/150 |
| 5,833,328 | 11/1998 | Matsuda | 303/150 |
| 5,868,473 | 2/1999 | Kato et al. | 303/122.09 |

FOREIGN PATENT DOCUMENTS

3079460  4/1991  Japan .

*Primary Examiner*—Douglas C. Butler
*Assistant Examiner*—Melanie Talavera
*Attorney, Agent, or Firm*—Burns, Doane, Swecker & Mathis, LLP

[57]             ABSTRACT

An anti-skid control system includes a hydraulic pressure generator for generating hydraulic brake pressure, hydraulic pressure control valves which control the brake hydraulic pressure of the wheel cylinders, wheel speed sensors for detecting the rotational speed of the wheels, and a controller for controlling the hydraulic pressure control valves to decompress or pulse-boost the brake hydraulic pressure in the wheel cylinders based on the output signal of the wheel speed sensors. A brake pedal depression amount detecting device detects the amount of depression of the brake pedal. The controller includes a road surface change judging device for judging that the road surface has shifted from a surface having a low coefficient of friction to a surface having a high coefficient of friction when a continuous run pulse number or a continuous run time of the pulse boost control exceeds a preset value. A duty ratio changing device changes the duty ratio of the pulse boost control to increase the rate of boost time when the road surface change judging device has judged a shift from a road surface having a low coefficient of friction to a road surface having a high coefficient of friction. A pulse boost executing device controls the hydraulic pressure control valve to pulse-boost the brake hydraulic pressure of the wheel cylinders based on the duty ratio changed by the duty ratio changing device, and a preset value changing device changes the preset value based on the output signal of the depression amount detecting device.

7 Claims, 5 Drawing Sheets

ANTI-SKID CONTROL SYSTEM

This application corresponds to and claims priority under 35 U.S.C. § 119 with respect to Japanese Application No. 09(1997)-297453 filed on Oct. 29, 1997 and Japanese Application No. 09(1997)-297455 filed on Oct. 29, 1997, the entire content of both of which is incorporated herein by reference.

FIELD OF THE INVENTION

The present invention relates to vehicle braking systems. More particularly, the present invention pertains to an anti-skid control system that performs decompression control and pulse boosting control.

BACKGROUND OF THE INVENTION

Japanese Patent Laid-Open No. Hei. 3-79460 discloses an anti-skid control system for maintaining a slip ratio of a wheel in the vicinity of an optimum slip ratio where the coefficient of friction of the wheel with respect to a road surface (hereinafter referred to as a surface $\mu$) is maximized by detecting the wheel speed and the body speed, and by boosting/reducing the brake hydraulic pressure of the wheel cylinder corresponding to the detected deviation (i.e., the slip amount).

When the control for boosting the hydraulic pressure of the wheel cylinder continues for more than a predetermined time, the system judges that the surface $\mu$ has shifted from low $\mu$ to high $\mu$ and sets the fluid pressure boosting rate to be large. Thereby, the system can boost the fluid pressure quickly to the pressure required for giving the optimum slip ratio without causing the G slip-out phenomenon even when the surface $\mu$ changes suddenly at the time of braking.

However, because the predetermined time which is compared with the continuous run time of the boost control is fixed, the timing for increasing the gradient of boost is always the same. Accordingly, the timing for increasing the gradient of boost cannot be changed based on the amount of depression of a brake pedal. That is, there is a possibility that the deceleration expected by the driver cannot be obtained because the timing for increasing the gradient of boost cannot be hastened when the amount of depression of the brake pedal is large as compared to the case when the brake pedal depression amount is small.

Further, the above-mentioned system is not able to detect an increase in the amount of depression of the brake pedal (i.e., the so-called increased tread) and does not change the fluid pressure boosting rate to be large when the increased tread or depression takes place. Accordingly, there exists the possibility that the body deceleration as expected by the driver is not obtained when the increased brake pedal depression takes place.

Accordingly, a need exists for a brake system that is able to change the timing for increasing the gradient of boost corresponding to a tread-on or depression amount of the brake pedal in an anti-skid control system by judging that a road surface has shifted from low surface $\mu$ to high surface $\mu$ when the continuous run time of the boost control exceeds a preset time.

A need also exists for a brake system that is able to obtain a body deceleration as expected by the driver when the driver presses on the brake pedal increasingly under the pulse boost control.

SUMMARY OF THE INVENTION

The present invention provides an anti-skid control system that includes wheel cylinders for applying a braking force to the wheels of a vehicle, a hydraulic pressure generating unit for generating a brake hydraulic pressure corresponding to the tread-on amount or amount of depression of the brake pedal and for applying the brake hydraulic pressure to the wheel cylinders, hydraulic pressure control valves disposed between the wheel cylinders and the hydraulic pressure generating unit for controlling the brake hydraulic pressure of the wheel cylinders, wheel speed sensors for detecting the rotational speed of the wheels, and a control device for controlling the hydraulic pressure control valves to at least decompress or pulse-boost the brake hydraulic pressure of the wheel cylinders based on the output signal of the wheel speed sensors. The anti-skid control system further includes a tread-on or depression amount detecting device for detecting the amount of depression of the brake pedal, and the control device includes a road surface change judging mechanism for judging that the road surface has shifted from a surface having a low coefficient of friction to a surface having a high coefficient of friction when a continuous run pulse number or a continuous run time of the pulse boost control exceeds a preset value. A duty ratio changing device changes the duty ratio of the pulse boost control to increase the rate of boost time when the road surface change judging device has judged that the road surface has shifted from that of a low coefficient of friction to that of a high coefficient of friction. A pulse boost executing device controls the hydraulic pressure control valve to pulse-boost the brake hydraulic pressure of the wheel cylinders based on the duty ratio changed by the duty ratio changing device. A preset value changing device changes the preset value based on the output signal of the tread-on amount detecting device.

The system judges that the road surface has shifted from that of a low coefficient of friction to that of a high coefficient of friction and changes the duty ratio of the pulse boost control to increase the rate of boost time when the continuous run pulse number or the continuous run time of the pulse boost control is more than the preset value. It is thus possible to increase the gradient of boost when the coefficient of friction of the road surface changes from low friction to high friction to avoid the G slip-out phenomenon.

Further, the present value to be compared with the continuous run pulse number or the continuous run time of the pulse boost control is changed corresponding to the brake pedal depression amount so that the timing for increasing the gradient of boost may be changed corresponding to the brake pedal depression amount and the pulse boost control may be performed corresponding to the intent of the driver. It is preferable to configure the system such that the present value changing device changes the preset value to be large when the brake pedal depression amount is small and to be small when the brake pedal depression amount is large.

According to this arrangement, because the preset value is increased when the brake pedal depression amount is small, it is possible to delay the timing for increasing the gradient of boost. Further, because the present value is reduced when the brake pedal depression amount is large, it is possible to quicken the timing for increasing the gradient of boost.

It is preferable that the system also include a quantity-of-braking-state detecting device for detecting the quantity of braking state of the vehicle and the present value changing device changes the preset value based on the detected result of the quantity-of-braking-state detecting device. The brake hydraulic pressure of the wheel cylinder and the deceleration of the vehicle may be used to determine the quantity of braking state. The preset value is thus changed corresponding to the quantity of braking state of the vehicle so that the shift from a road surface of low coefficient of friction to that of a high coefficient of friction may be judged accurately. The preset value changing device preferably changes the preset value to be small when the quantity of braking state detected by the-quantity-of-braking-state detecting device is small and to be large when the quantity is large.

The difference in pressure between the output hydraulic pressure of the hydraulic pressure generating unit and the hydraulic pressure of the wheel cylinder becomes large when the quantity of braking state (i.e., the control hydraulic pressure) is small so that a run pulse number required until when the wheel almost reaches a lock pressure is relatively small in the pulse boost control. Accordingly, the change in the surface condition may be judged accurately by reducing the preset value. On the other hand, the difference in pressure between the output hydraulic pressure of the hydraulic pressure generating unit and the hydraulic pressure of the wheel cylinder becomes small when the quantity of braking state (i.e., the control hydraulic pressure) is large so that a run pulse number required until when the wheel almost reaches the lock pressure is relatively large in the pulse boost control. Accordingly, the change in the surface condition may be judged accurately by increasing the preset value.

The system can also include a slip amount computing device for computing the slip amount of the wheel based on the output signal of the wheel speed sensor, with the road surface change judging device determining that the road surface has shifted from that of a low coefficient of friction to that of a high coefficient of friction when the continuous run pulse number or the continuous run time of the pulse boost control is more than the preset value and when the wheel slip amount computed by the slip amount computing device is less than a predetermined value. According to this arrangement, the system judges that the road surface has shifted from that having a low coefficient of friction to that having a high coefficient of friction when the continuous run pulse number or the continuous run time of the pulse boost control is more than the preset value and when the slip amount of the wheel is less than the predetermined value so that it can judge the change in the road surface more accurately.

According to another aspect of the invention, an anti-skid control system includes wheel cylinders for applying a braking force to wheels of a vehicle, a hydraulic pressure generating unit for generating a brake hydraulic pressure corresponding to the amount of depression of the brake pedal and for applying the brake hydraulic pressure to the wheel cylinders, hydraulic pressure control valves disposed between the wheel cylinders and the hydraulic pressure generating unit for controlling the brake hydraulic pressure of the wheel cylinders, wheel speed sensors for detecting the rotational speed of the wheels, and a controller for controlling the hydraulic pressure control valves to at Least decompress or pulse-boost the brake hydraulic pressure of the wheel cylinders based on an output signal of the wheel speed sensors. A brake pedal depression amount detecting device detects the depression amount of the brake pedal, and the controller includes an increased depression judging device for judging whether or not the depression amount of the brake pedal has been increased based on the detected result of the brake pedal depression amount detecting device. A duty ratio changing device changes the duty ratio of the pulse boost control to increase the rate of boost time when the increased depression judging device has judged that the brake pedal depression amount has increased, and a pulse boost executing device controls the hydraulic pressure control valve to pulse-boost the brake hydraulic pressure of the wheel cylinders based on the duty ratio changed by the duty ratio changing device.

The duty ratio of the pulse boost control is changed such that its rate of boost time is increased when the brake pedal depression amount is increased so that the body deceleration as expected by the driver can be obtained when the driver presses on the pedal increasingly under the pulse boost control.

The controller preferably includes a road surface change judging device for judging that the road surface has shifted from that having a low coefficient of friction to that having a high coefficient of friction when a continuous run pulse number or a continuous run time of the pulse boost control exceeds a predetermined value when the increased depression judging device judges that the brake pedal depression amount has increased, and the duty ratio changing device changes the duty ratio of the pulse boost control to increase the rate of boost time when the road surface change judging device judges that the road surface has shifted from that having a low coefficient of friction to that having a high coefficient of friction. The system is this able to judge that the road surface has shifted from are having a low coefficient of friction to are having a high coefficient of friction when the continuous run pulse number or the continuous run time of the pulse boost control is more than the preset value during when the pedal is depressed increasingly and changes the duty ratio of the pulse boost control to increase its rate of boost time further so that it is possible to increase the gradient of boost at the time when the coefficient of friction of the road surface changes from low to high during the increased brake pedal depression and to avoid the G slip-out phenomenon.

BRIEF DESCRIPTION OF DRAWING FIGURES

Additional features and characteristics of the present invention will become more apparent from the following detailed description considered with reference to the accompanying drawing figures in which like elements are designated by like reference numerals and wherein.

DETAILED DESCRIPTION OF PREFERRED EMBODIMENT

Figure 1:
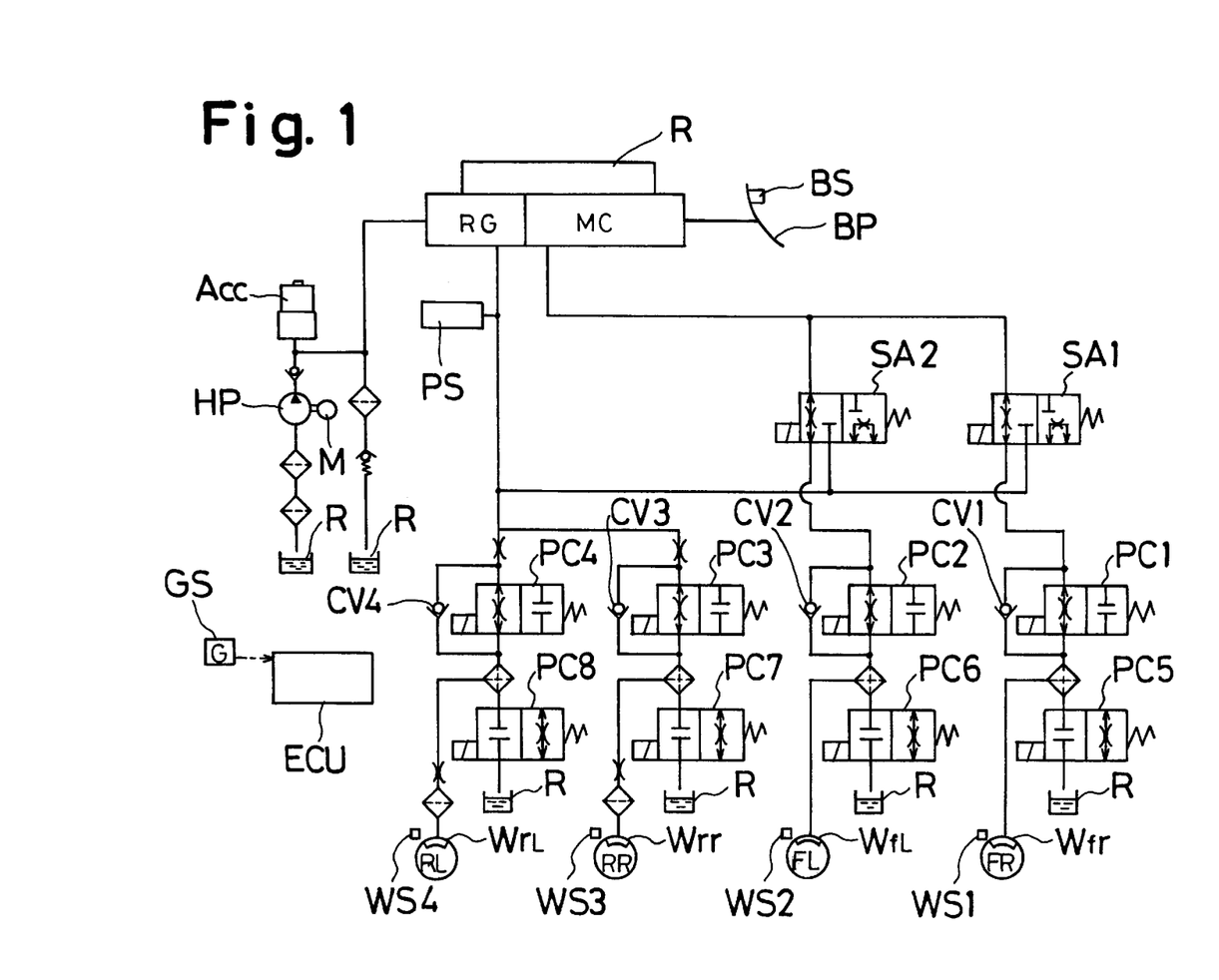
FIG. 1 is a schematic illustration of the anti-skid control system according one embodiment of the present invention.

The anti-skid control system according to the present invention includes, as seen in FIG. 1, a master cylinder MC and a regulator RG which are driven or operated based on the manipulation or operation of a brake pedal BP. An accumulator Acc is connected to the regulator RG and to a master cylinder reservoir R via a hydraulic pressure pump HP. The hydraulic pressure pump HP is driven by an electric motor M and draws brake fluid from the master cylinder reservoir R to boost the brake fluid. This brake fluid is supplied to and accumulated in the accumulator Acc.

The electric motor M is driven based on the hydraulic pressure within the accumulator Acc. Thus, the motor M is driven when the pressure within the accumulator Acc falls below a predetermined lower limit value and stops operating when the hydraulic pressure within the accumulator Acc exceeds a predetermined upper limit value. A so-called power hydraulic pressure is thus supplied from the accumulator Acc to the regulator RG as necessary.

The regulator RG inputs the output hydraulic pressure of the accumulator Acc and by setting an output hydraulic pressure of the master cylinder MC as a pilot pressure, controls the pressure of the master cylinder MC to a hydraulic pressure proportional to the pilot pressure. Thus, the master cylinder MC is boosted. It is noted that the regulator RG can be of the type that includes a spool valve and a poppet valve.

The master cylinder MC is connected to a front right wheel cylinder Wfr via a three-port two-position change-over electromagnetic valve SA1 and a normally open type switching electromagnetic valve PC1. The master cylinder MC is connected to a front left wheel cylinder Wfl via a three-port two-position change-over electromagnetic valve SA2 and a normally open type switching electromagnetic valve PC2. The wheel cylinders Wfr, Wfl are connected to the master cylinder reservoir R via normally closed type switching electromagnetic valves PC5, PC6, respectively. The change-over electromagnetic valves SA1, SA2 are positionable in a first position for communicating and connecting the respective switching electromagnetic valves PC1, PC2 to the master cylinder MC and for shutting them off from communication with the regulator RG in the normal state, and are movable to a second position for shutting off the switching electromagnetic valve PC1, PC2 from the master cylinder MC and for communicating them with the regulator RG when the anti-skid control is performed.

Respective check valves CV1, CV2 for permitting the brake fluid to flow only from the wheel cylinders to the master cylinder MC are connected in parallel to the respective switching electromagnetic valves PC1, PC2. The check valves CV1, CV2 allow the brake hydraulic pressure of the wheel cylinders Wfr, Wfl to be reduced accordingly when the brake pedal BP is released when the respective switching electromagnetic valves PC1, PC2 are closed.

The regulator RG is connected to a rear right wheel cylinder Wrr via a normally open type switching electromagnetic valve PC3 and to a rear left wheel cylinder Wrl via a normally open type switching electromagnetic valve PC4. The wheel cylinders Wrr, Wrl are connected to the master cylinder reservoir R via normally closed type switching valves PC7, PC8, respectively. Respective check valves CV3, CV4 which permit the brake fluid to flow only from the wheel cylinders to the regulator RG are connected in parallel to the respective switching electromagnetic valves PC3, PC4. The check valves CV3, CV4 allow the brake hydraulic pressure of the wheel cylinders Wrr, Wrl to be reduced accordingly upon release of the brake pedal BP when the respective switching electromagnetic valves PC1, PC2 are closed.

When the driver treads or presses on the brake pedal BP, the master cylinder MC and the regulator RG generate a hydraulic pressure accordingly. The hydraulic pressure outputted from the master cylinder MC is supplied to the wheel cylinders Wfr, Wfl for the front wheels and the hydraulic pressure outputted from the regulator RG is supplied to the wheel cylinders Wrr, Wrl for the rear wheels. Meanwhile, when the driver releases the brake pedal BP, the brake fluid in the wheel cylinders Wfr, Wfl for the front wheels is returned to the master cylinder MC and the brake fluid in the wheel cylinders Wrr, Wrl for the rear wheels is returned to the regulator RG.

When the slip ratio of the front right wheel FR becomes excessive and is inclined to be locked during vehicle braking for example, the switching electromagnetic valve PC1 is closed and the switching electromagnetic valve PC5 is opened. As a result, the brake hydraulic pressure in the wheel cylinder Wfr decreases. When the slip ratio of the front right wheel FR becomes too small on the other hand, the switching electromagnetic valve PC5 is closed and the switching electromagnetic valve PC1 is opened. As a result, the brake hydraulic pressure of the wheel cylinder Wfr is increased moderately (so-called pulse boost). The anti-skid control is operated by alternately repeating the above-mentioned decompression control and the pulse boost control.

The electromagnetic valves PC1, PC2, PC3, PC4, PC5, PC6, PC7, PC8, SAI, SA2 are electrically connected to an electronic control unit ECU. Respective wheel speed sensors WS1, WS4 for detecting the rotational speed of the respective wheels are disposed at the wheels FR, FL, RR RL. Additionally, a brake switch BS for detecting the manipulation or operation of the brake pedal BP is mounted to the brake pedal BP and a pressure sensor PS for detecting the output hydraulic pressure of the regulator RG is connected to the regulator RG. Also, a longitudinal acceleration sensor GS for detecting a longitudinal acceleration (longitudinal deceleration) of the vehicle is mounted at the position of the center of gravity of the vehicle. The above-mentioned sensors WS1, WS2, WS3, WS4, BS, PS, GS are all electrically connected to the electronic control unit ECU.

Figure 2:
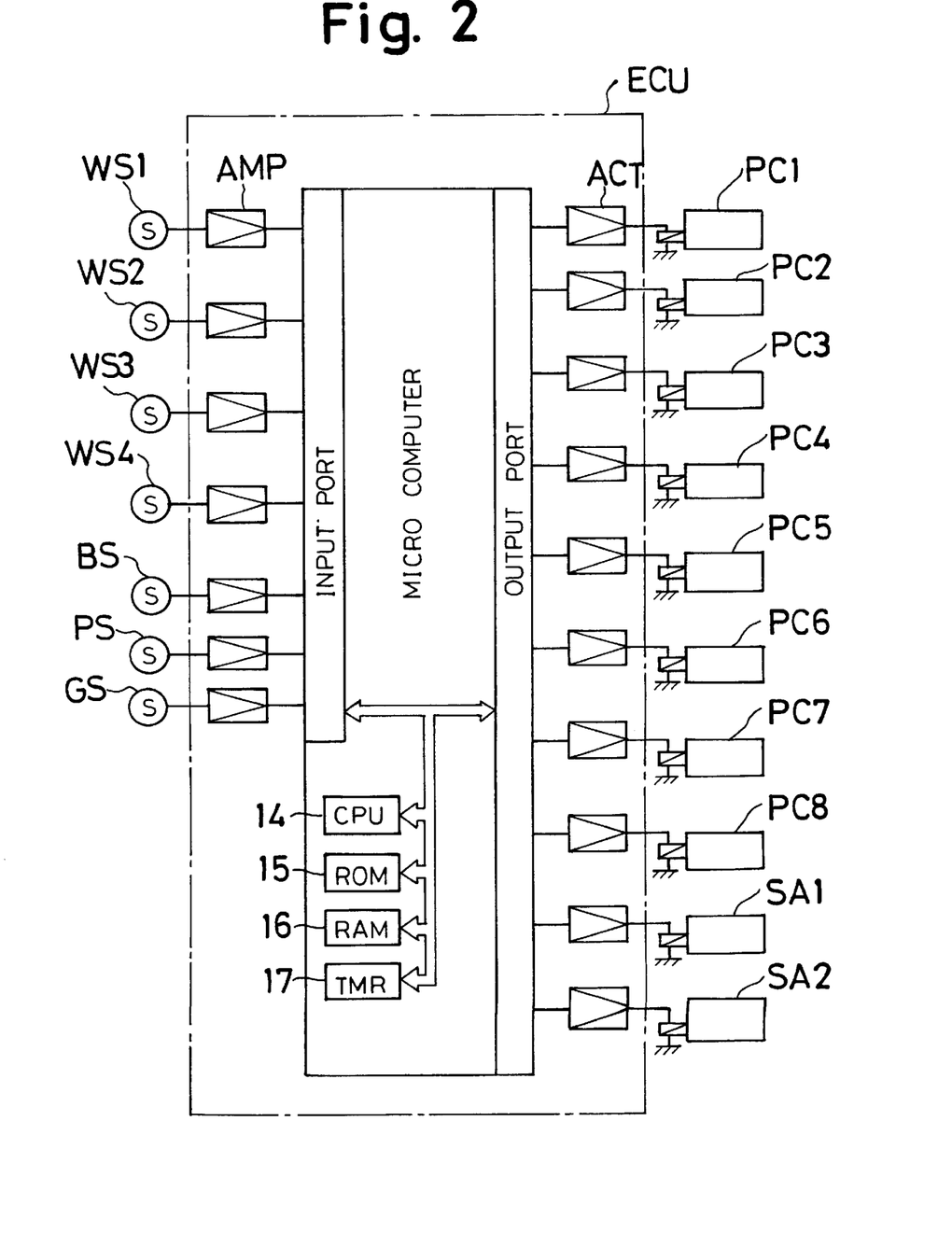
FIG. 2 is a block diagram illustrating the structure of the electronic control unit in the system shown in FIG. 1.

As shown in FIG. 2, the electronic control unit ECU includes a microcomputer MCP composed of a CPU 14, a ROM 15, a RAM 16, a timer TMR 17, an input port IPT and an output port OPT which are connected to each other via a bus. The output signals from the brake switch BS and the various sensors WS1, WS2, WS3, WS4, PS, GS are inputted to the CPU 14 from the input port IPT, respectively, via an amplifier circuit AMP. Further, a driving signal is outputted from the output port OPT to the electromagnetic valves PC1, PC2, PC3, PC4, PC5, PC6, PC7, PC8, SA1, SA2 via a driver circuit ACT. In the microcomputer MCP, the ROM 15 stores a program corresponding to the flowcharts shown in FIGS. 3–5, the CPU 14 executes the program during when the ignition switch is closed, and the RAM 14 temporarily stores variable data necessary for executing the program.

Figure 3:
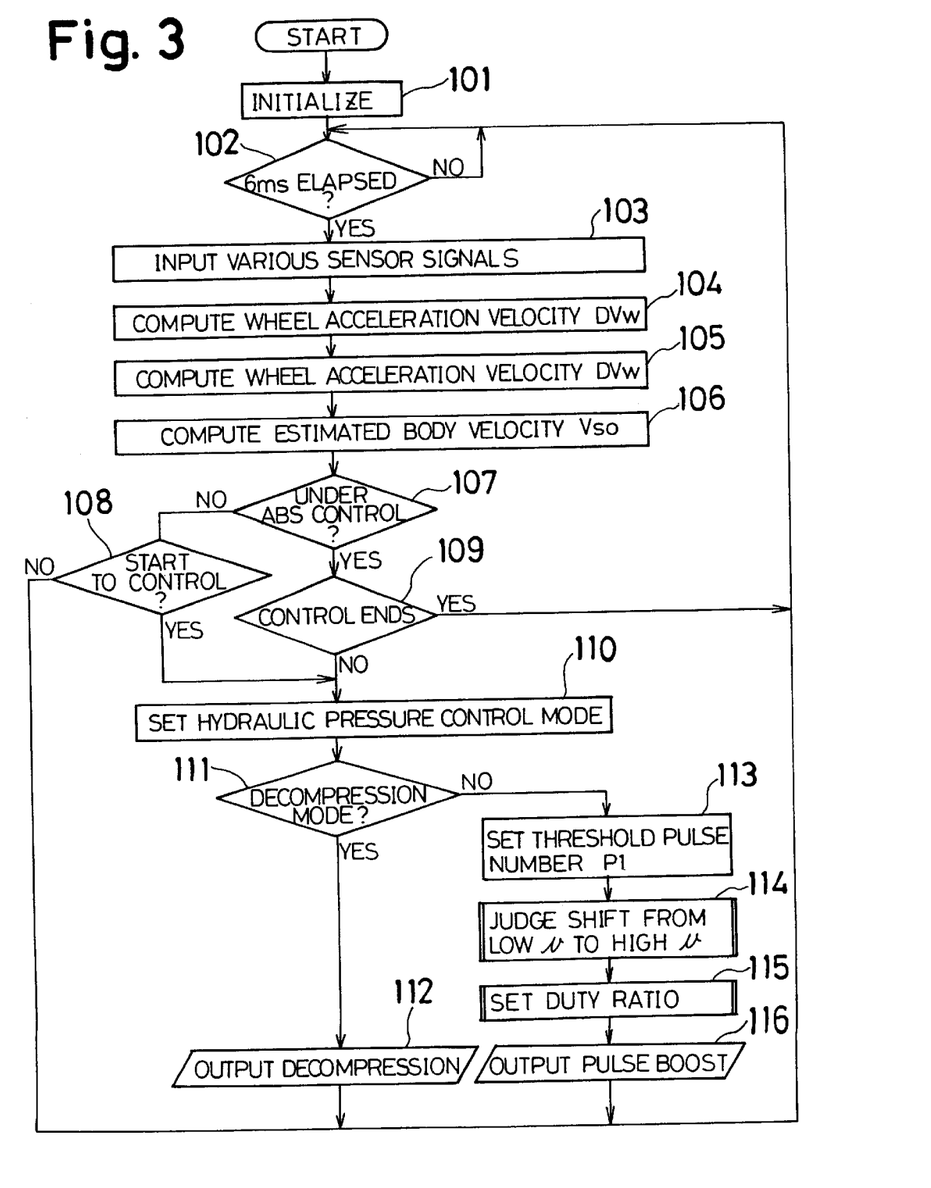
FIG. 3 is a flowchart showing the main routine of the anti-skid control according to the present invention.

Execution of the program corresponding to the flowchart shown in FIG. 3 is started when the ignition switch is closed. At first, the microcomputer MCP is initialized in Step 101 and various arithmetic values, an estimated body speed Vso indicative of a car speed, a wheel speed Vw and a wheel acceleration DVw of each wheel are cleared. Then, in Step 102, the CPU 14 judges whether or not 6 ms has elapsed. When such time has elapsed, the process advances to Step 103. If 6 ms has not elapsed, the program waits until such time period has elapsed. In Step 103, the output signals from the brake switch BS and the various sensors WS1, WS2, WS3, WS4, PS, GS are inputted. Then, the process advances to Step 104 to compute a wheel speed Vw of the respective wheels based on the output signals of the wheel speed sensors WS1, WS2, WS3, WS4. Then, in Step 105, a wheel acceleration velocity DVw of the respective wheel s is computed from the determined wheel speed values. Then, the CPU computes an estimated body speed Vso as Vso= MAX (Vw) based on the wheel speed Vw of each wheel.

Next, the process advances to Step 107 to judge whether or not the respective wheels are under anti-skid control. If not, a determination is made in Step 108 concerning whether or not control starting conditions exist based on the signal from the brake switch BS, and the wheel speed Vw, the estimated body speed Vso and the wheel acceleration velocity DVw. More specifically, the CPU computes the slip ratio S of the wheel as S=(Vso−Vw)/Vso based on the wheel speed Vw and the estimated body speed Vso, and determines that it is necessary to start the control when the slip ratio S is more than a predetermined value and the wheel deceleration is more than a predetermined value. When it is determined that the control starting conditions do not exist, the process returns to Step 102. On the other hand, when it is determined that the control starting conditions do exist, the process advances to Step 110 .

When it is judged in Step 107 that the wheels are under anti-skid control, it is determined in Step 109 whether or not the control ending conditions exist based on the signal from the brake switch BS, and the wheel speed Vw, the estimated body speed Vso and the wheel acceleration velocity DVw. Assuming it is determined that the control ending conditions do exist, tie process returns to Step 102. If it is found in Step 109 that the control ending conditions do not exist, the process advances to Step 110.

In step 110, the CPU sets a hydraulic pressure control mode for each wheel to either a decompression mode or a pulse boost mode based on the slip ratio S of the wheel and the wheel acceleration velocity DVw. It is noted that a hold mode, a pulse decompression mode and a quick boost mode may be added. Next, the process advances to Step 111 to judge whether or not the hydraulic pressure control mode of each wheel set in Step 110 is the decompression mode. If it is determined that it is the decompression mode, the process advances to Step 112 to output a decompression signal to the electromagnetic valves, e.g. the electromagnetic valves PC1, PC5, corresponding to the wheel to be controlled. That is, the electromagnetic valves PC1, PCS are continuously energized, thus closing the electromagnetic valve PC1 and opening the electromagnetic valve PC5.

When it is judged in Step 111 that the hydraulic pressure mode of the wheel to be controlled is not the decompression mode (i.e., the hydraulic pressure mode is the pulse boost mode), the process advances to Step 113 to set a threshold value P1 of a pulse number of the pulse boost control used in judging a shift from low friction μ to high friction μ in the next Step 114. More specifically, the threshold pulse number P1 is set by using Table 1 based on the regulator pressure detected by the pressure sensor PS and the body deceleration detected by the longitudinal acceleration sensor GS. As is apparent from Table 1, the threshold pulse number P1 is set to be large when the regulator pressure (i.e. , the brake pedal depression or tread amount) is small, whereas the threshold pulse number P1 is set to be small when the pressure is large. Further, the threshold pulse number P1 is set to be small when the body deceleration (G) is small and is set to be large when the speed or body deceleration is large.

As described above, the threshold pulse number P1 is set based on the regulator pressure and the body deceleration. However, it is noted that indicators representing brake pedal depression amounts such as a detected value of the master cylinder pressure sensor, a detected value of a pedal leg-power sensor and a detected value of a pedal stroke sensor may be used instead of the regulator pressure. It is also possible to use indicators representing the controlled hydraulic pressure such as the body deceleration computed from the estimated body speed Vso computed from the wheel speed Vw and a detected value of a wheel cylinder pressure sensor instead of the body deceleration.

| Body Deceleration (G) | Regulator 0 to 4.9 | Pressure 4.9 to 9.8 | (Mpa) 9.8 |
|---|---|---|---|
| 0 to 0.2 | 4 | 3 | 3 |
| 0.2 to 0.4 | 4 | 4 | 3 |
| 0.4 to 0.6 | 5 | 4 | 4 |
| 0.6 to 0.8 | 6 | 5 | 4 |

The program then advances to Step 114 to judge the shift from low μ to high μ (described later) and then advances to Step 115 to set a duty ratio D (described later) in the pulse boost control. Thereafter, the process advances to Step 116 to output a pulse boost signal to the electromagnetic valve, e.g., the electromagnetic valve PC1, corresponding to the wheel to be controlled. That is, the appropriate electromagnetic valve, e.g., the electromagnetic valve PC1, is duty-energized based on the duty ratio D set in Step 115.

Figure 4:
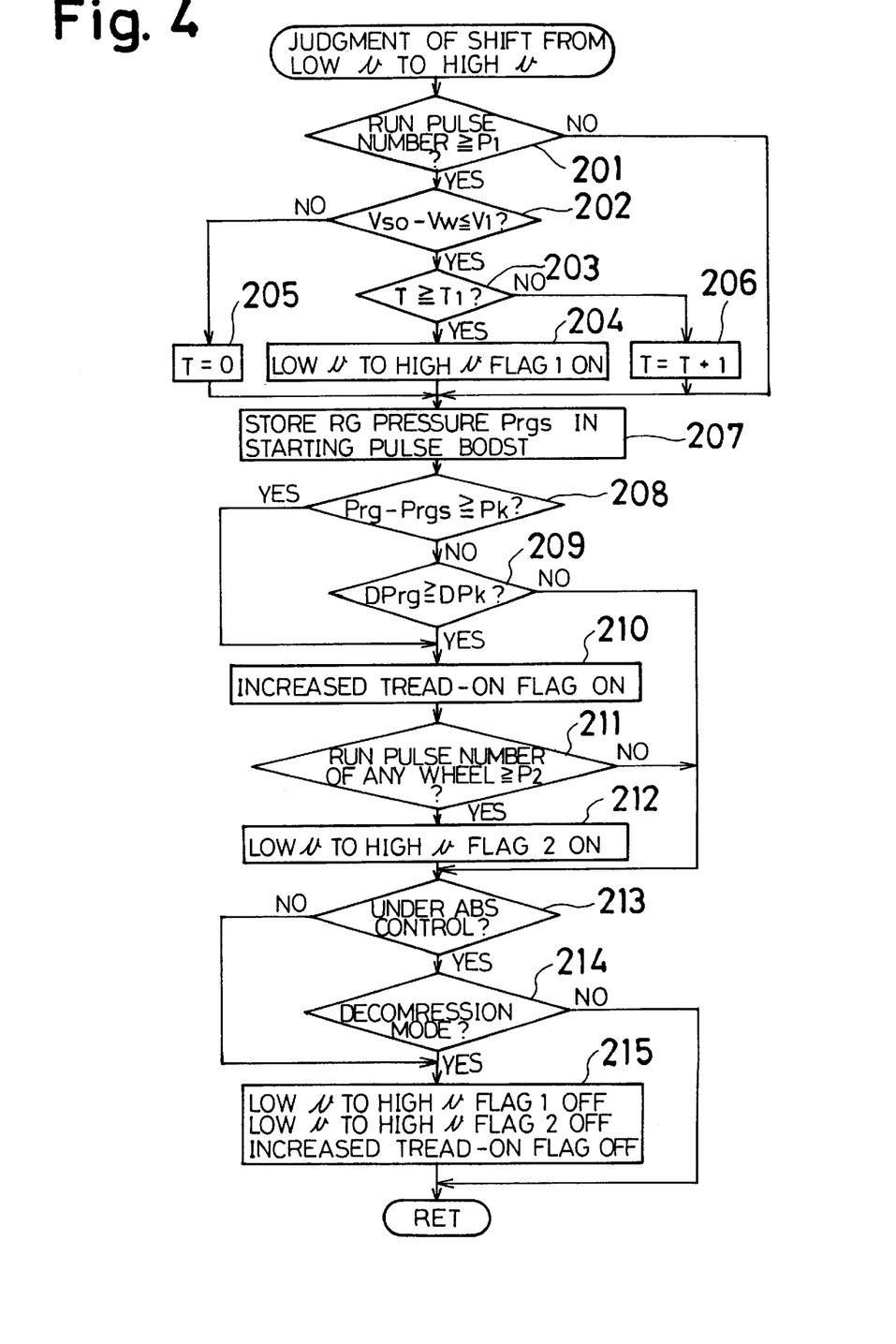
FIG. 4 is a flowchart showing the routine used to judge a shift from low $\mu$ to high $\mu$ in FIG. 3.

The determination of the shift from low μ to high μ in Step 114 of the program shown in FIG. 3 will be explained with reference to FIG. 4. At first, in Step 201, a run pulse number of the pulse boost control is compared with the threshold pulse number P1 set in Step 113 in FIG. 3. When the run pulse number is less than the threshold number P1, the process advances to Step 207. When the run pulse number is greater than or equal to the threshold number P1, the process advances to Step 202. In Step 202, it is determined whether or not the slip amount (Vso−Vw) of the wheel to be controlled is less than or equal to a predetermined amount VI. If it is, the process advances to Step 203 to judge whether or not a timer T has reached or exceeds a predetermined time T1 (that is, that the state of YES has continued more than the predetermined time in Steps 201 and 202). If the timer T has reached or exceeds the predetermined time T1, the process advances to Step 204 to turn on a low μ to high μ flag 1, and then advances to Step 207.

On the other hand, when the slip amount is found to be more than the predetermined amount V1 in Step 202, the process advances to Step 205 and then to Step 207 after resetting the timer T to zero. Further, when the timer T1 counts less than the predetermined time T1 in Step 203, the process advances to Step 206 at which the count of the timer T is incremented by (+1) and then advances to Step 207.

In Step 207, a regulator pressure Prgs at the moment in time when the mode is changed to the pulse boost mode (i.e., at the moment in time when the mode is switched from the decompression mode to the pulse boost mode) is memorized. Thus, this step is passed by or jumped at a time other than the moment in time when the mode is changed to the pulse boost mode. Next, the process advances to Step 208 to judge whether or not a difference in pressure of the current regulator pressure Prg and the regulator pressure Prgs at the moment in time when the mode is switched to the pulse boost mode is more than a predetermined value Pk (i.e., whether or not the driver has further depressed the pedal or depressed the pedal increasingly). If the determination in Step 208 is yes, the process advances to Step 210 to turn on an increased tread-on or depression flag. When it is found in Step 208 that the difference in pressure Prg−Prgs is less than the predetermined value Pk, the process advances to Step 209 to determine whether or not a differential value DPrg of the regulator pressure Prg is greater than or equal to a predetermined value DPk. If it is, the process advances to Step 210 to turn on the increased depression or tread-on flag. When it is determined in Step 209 that the differential value DPrg of the regulator pressure Prg is less than the predetermined value DPk, the process advances to Step 213.

After processing Step 210, the process advances to Step 211 to determine whether or not the run pulse number of any of the wheels to be controlled is greater than or equal to a predetermined value P2 which is a constant value. If the determination in Step 211 is yes, the process advances to Step 213 after turning on the low $\mu$ to high $\mu$ flag 2. When the run pulse number is less than the predetermined value P2, the process advances to Step 213.

In Step 213, it is determined whether or not the system is under anti-skid control. If it is, the process advances to Step 214 to judge whether or not the hydraulic pressure control mode of the controlled wheel is the decompression mode. If the hydraulic pressure control mode of the controlled wheel is not the decompression mode, the process advances to the main routine shown in FIG. 3. When it is found in Step 213 that the wheel is not under the anti-skid control or when it is judged in Step 214 that the hydraulic pressure control mode of the controlled wheel is the decompression mode, the process advances to Step 215 to turn off the low $\mu$ to high $\mu$ flag 1, to turn off the low $\mu$ to high $\mu$ flag 2, and to turn off the increased tread-on or depression flag.

Figure 5:
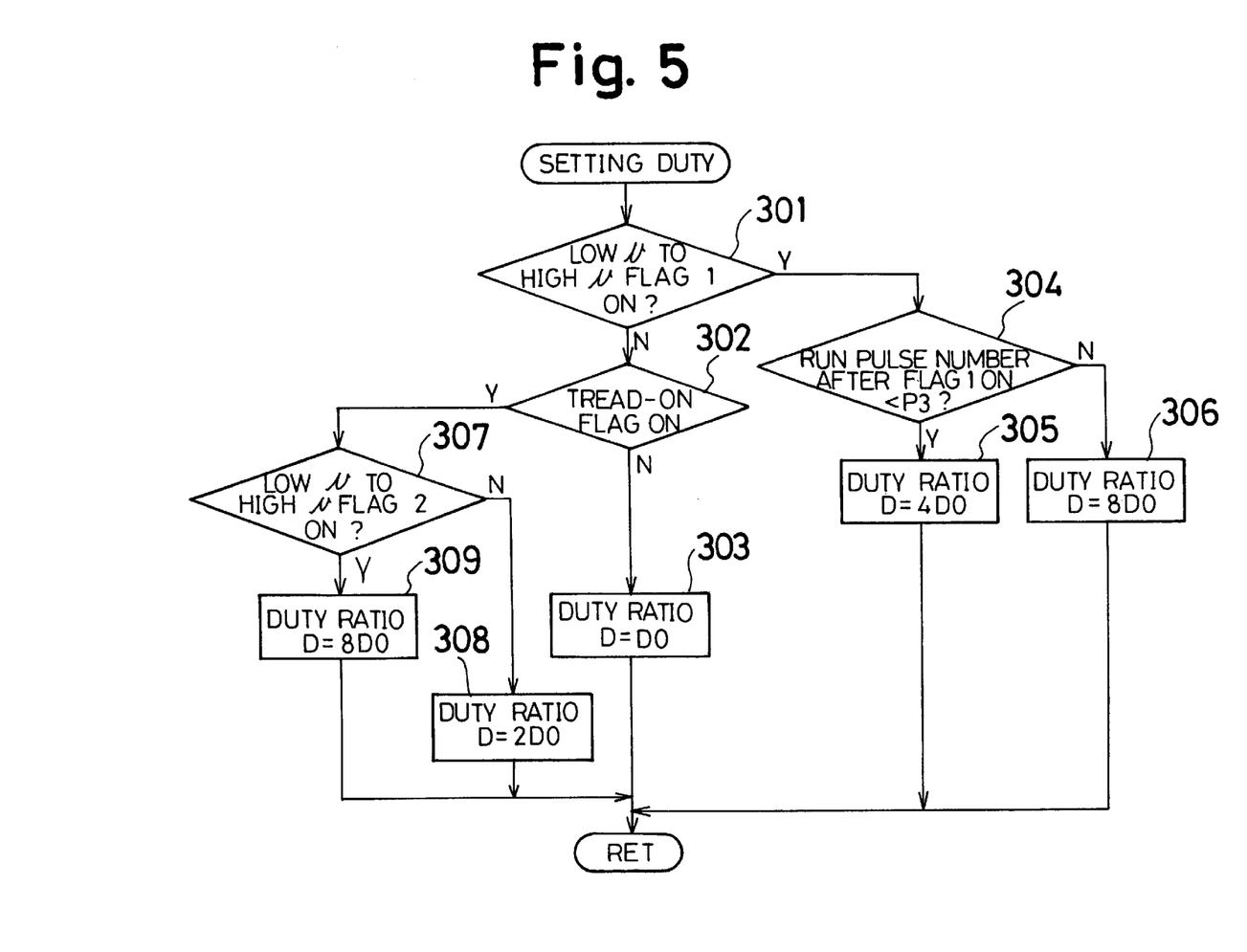
FIG. 5 is a flowchart showing the routine for setting a duty ratio.

The process of setting the duty ratio D in Step 115 in FIG. 3 will be explained with reference to the subroutine shown in FIG. 5. At first, it is determined in Step 301 whether or not the low $\mu$ to high $\mu$ flag 1 is ON. When the low $\mu$ to high $\mu$ flag 1 is OFF, the process advances to step 302 to judge whether or not the increased brake pedal tread-on or depression flag is ON. When the increased brake pedal tread-on or depression flag is also OFF, the duty ratio D to be supplied as the pulse boost output in Step 116 in FIG. 3 is set at an ordinary duty ratio DO in Step 303. Here, the ordinary duty ratio DO is set corresponding to the slip ratio and the wheel deceleration of the controlled wheel in Step 110 in FIG. 3.

When it is determined in Step 301 that the low $\mu$ to high $\mu$ flag 1 is ON, the process advances to Step 304 to judge whether or not the run pulse number after when the low $\mu$ to high $\mu$ flag 1 is ON is less than a predetermined value P3 which is a constant value. If the run pulse number is less than a predetermined value P3, the process advances to Step 305 to set the duty ratio D at a value of four times of the ordinary duty ratio DO When the run pulse number after when the low $\mu$ to high $\mu$ flag 1 is ON exceeds the predetermined value P3, the duty ratio D is set at a value of eight times of the ordinary duty ratio DO in Step 306.

When it is determined in Step 302 that the increased tread-on flag is ON, the process advances to Step 307 to judge whether or not the low $\mu$ to high $\mu$ flag 2 is ON. When the low $\mu$ to high $\mu$ flag 2 is OFF (that is, only the increased tread-on or depression flag is ON), the duty ratio D is set at a value of two times of the ordinary duty ratio DO in Step 308. When the low $\mu$ to high $\mu$ flag 2 is also ON, the duty ratio D is set at a value of eight times of the ordinary duty ratio DO in Step 309.

According to the present invention, the system judges that the road surface has shifted from one having a low coefficient of friction to one having a high coefficient of friction and changes the duty ratio of the pulse boost control so as to increase the rate of boost time when the continuous run pulse number or the continuous run time of the pulse boost control exceeds the preset value. It is thus possible to increase the gradient of boost when the coefficient of friction of the road surface changes from low to high and to avoid the G slip-out phenomenon.

Also, because the preset value to be compared with the continuous run pulse number or the continuous run time of the pulse boost control is changed corresponding to the brake pedal depression or tread-on amount, it is possible to change the timing for increasing the gradient of boost corresponding to the brake pedal tread-on amount and to perform the pulse boost control in a manner corresponding to the intent of the driver.

In addition, the duty ratio of the pulse boost control is changed to increase the rate of boosting time so that the body deceleration as expected by the driver can be obtained when the driver increasingly steps on the pedal under the pulse boost control.

The principles, a preferred embodiment and the mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. An anti-skid control system, comprising:
   wheel cylinders for giving braking force to wheels of a vehicle;
   a hydraulic pressure generating unit for generating a brake hydraulic pressure corresponding to a tread-on amount of a brake pedal and for giving the brake hydraulic pressure to said wheel cylinders;
   hydraulic pressure control valves disposed between said wheel cylinders and said hydraulic pressure generating unit for controlling the brake hydraulic pressure of said wheel cylinders;
   wheel speed sensors for detecting rotational speed of said wheels; and
   control means for controlling said hydraulic pressure control valves so as to at least decompress or pulse-boost the brake hydraulic pressure of said wheel cylinders based on an output signal of said wheel speed sensors;
   tread-on amount detecting means for detecting the tread-on amount of said brake pedal; and said control means comprises:
   road surface change judging means for comparing a continuous run pulse number or a continuous run time of the pulse boost control with a preset value and for judging that the road surface has shifted from that of low coefficient of friction to that of high coefficient of friction when the continuous run pulse number or the continuous run time of the pulse boost control exceeds a preset value;
   duty ratio changing means for changing the duty ratio of the pulse boost control so as to increase the rate of boost time when said road surface change judging means has judged that the road surface shifted from that of low coefficient of friction to that of high coefficient of friction;
   pulse boost executing means for controlling said hydraulic pressure control valve so as to pulse-boost the brake hydraulic pressure of said wheel cylinders based on the duty ratio changed by said duty ratio changing means; and
   preset value changing means for changing said preset value based on an output signal of said tread-on amount detecting means.

2. The anti-skid control system according to claim 1, wherein said preset value changing means changes the preset value to be large when the brake pedal tread-on amount is small and to be small when the tread-on amount is large.

3. The anti-skid control system according to claim 1, further comprising quantity-of-braking-state detecting means for detecting a quantity of braking state of the vehicle and said preset value changing means changes said preset value based on the detected result of said quantity of braking state.

4. The anti-skid control system according to claim 3, wherein said preset value changing means changes said preset value to be small when the quantity of braking state detected by said quantity-of-braking-state detecting means is small and to be large when the quantity is large.

5. The anti-skid control system according to claim 1, further comprising slip amount computing means for computing a slip amount of the wheel based on the output signal of said wheel speed sensor; and said road surface change judging means judges that the road surface has shifted from that of low coefficient of friction to that of high coefficient of friction when the continuous run pulse number or the continuous run time of the pulse boost control is more than the preset value and when the wheel slip amount computed by said slip amount computing means is less than a predetermined value.

6. An anti-skid control system, comprising: wheel cylinders for giving braking force to wheels of a vehicle;

a hydraulic pressure generating unit for generating a brake hydraulic pressure corresponding to a tread-on amount of a brake pedal and for giving the brake hydraulic pressure to said wheel cylinders;

hydraulic pressure control valves disposed between said wheel cylinders and said hydraulic pressure generating unit for controlling the brake hydraulic pressure of said wheel cylinders;

wheel speed sensors for detecting-rotational speed of said wheels; and control means for controlling said hydraulic pressure control valves so as to at least decompress or pulse-boost the brake hydraulic pressure of said wheel cylinders based on an output signal of said wheel speed sensors;

tread-on amount detecting means for detecting the tread-on amount of said brake pedal; and said control means comprises:

increased tread-on judging means for judging whether or not the tread-on amount of said brake pedal has been increased based on the detected result of said tread-on amount detecting means;

duty ratio changing means for changing the duty ratio of the pulse boost control so as to increase the rate of boost time when said increased tread-on judging means has judged that the brake pedal tread-on amount has increased; and pulse boost executing means for controlling said hydraulic pressure control valve so as to pulse-boost the brake hydraulic pressure of said wheel cylinders based on the duty ratio changed by said duty ratio changing means.

7. The anti-skid control system according to claim 6, wherein said control means further comprises road surface change judging means for judging that the road surface has shifted from the surface of low coefficient of friction to the surface of high coefficient of friction when a continuous run pulse number or a continuous run time of the pulse boost control exceeds a predetermined value when said increased tread-on judging means judges that the brake pedal tread on amount has increased and duty ratio changing means changes the duty ratio of the pulse boost control so as to increase the rate of boost time when said road surface change judging means has judged that the road surface shifted from that of low coefficient of friction to that of high coefficient of friction.

* * * * *